(No Model.)
H. S. GOFF & A. B. JUDKINS.
TRAP.
No. 513,915.  Patented Jan. 30, 1894.
Fig. 1.
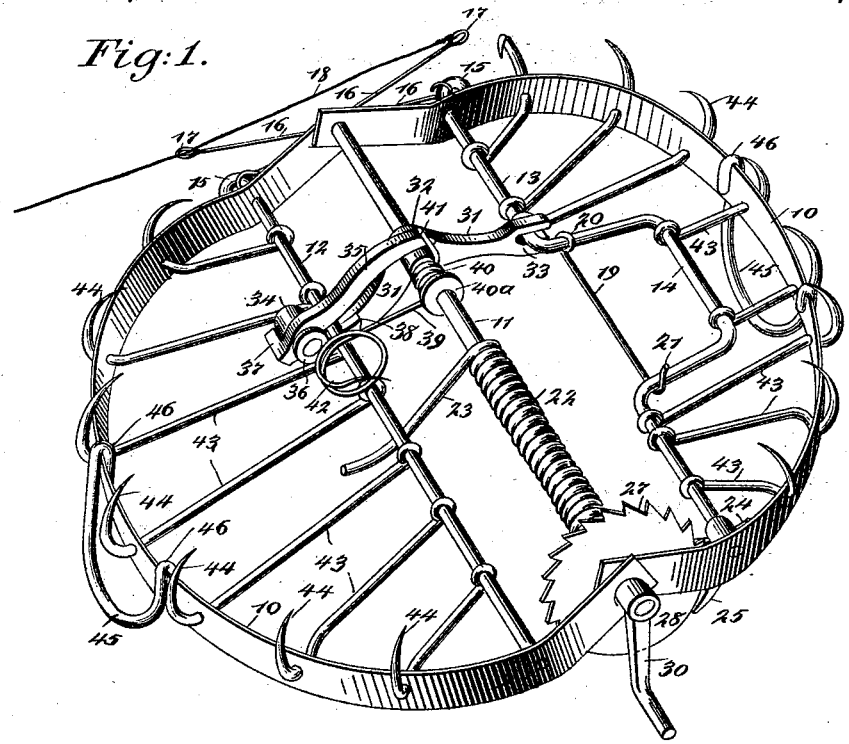
Fig. 2.  Fig. 3.
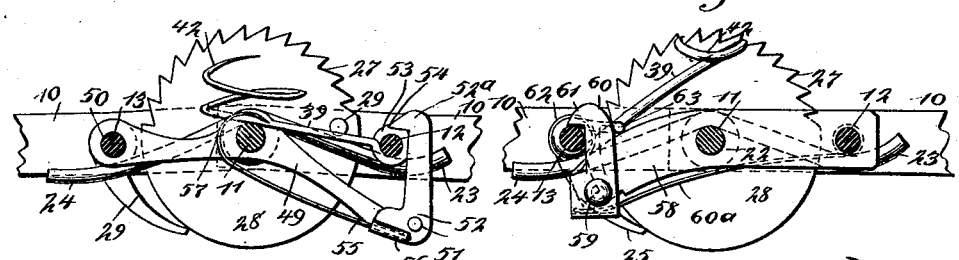
Fig. 4.  Fig. 6.
Fig. 5.
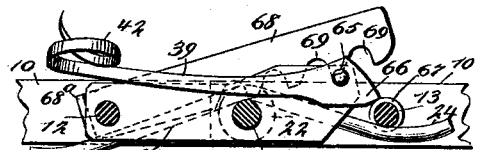
WITNESSES:
John A. Rennie
C. Sedgwick
INVENTORS
H. S. Goff
BY A. B. Judkins
Munn & Co
ATTORNEYS.
THE NATIONAL LITHOGRAPHING COMPANY,
WASHINGTON, D. C.

UNITED STATES PATENT OFFICE.

HUBBARD S. GOFF AND ALVIN B. JUDKINS, OF LOS ANGELES, CALIFORNIA.

TRAP.

SPECIFICATION forming part of Letters Patent No. 513,915, dated January 30, 1894.

Application filed February 25, 1893. Serial No. 463,682. (No model.)

*To all whom it may concern:*

Be it known that we, HUBBARD S. GOFF and ALVIN B. JUDKINS, both of Los Angeles, in the county of Los Angeles and State of California, have invented a new and Improved Trap, of which the following is a full, clear, and exact description.

Our invention relates to improvements in animal traps, such as are also adapted for use in catching fish, and our trap is an improvement on the trap shown in Letters Patent of the United States No. 475,215, dated May 17, 1892.

The object of our invention is to improve the details of the trap, to the end that it may be easily set and as easily sprung, and that it may be locked when sprung so as to make it absolutely impossible for any creature caught within its jaws, to escape.

To this end, our invention consists in certain features of construction and combinations of parts, which will be hereinafter described and claimed.

Reference is to be had to the accompanying drawings forming a part of this specification, in which similar figures of reference indicate corresponding parts in all the views.

Figure 1 is a perspective view of the trap, showing it set. Fig. 2 is a detail cross section illustrating a modified form of trigger mechanism. Fig. 3 is a detail cross section of a second modified form of trigger mechanism. Fig. 4 is a detail cross section, showing a third modified form of trigger mechanism. Fig. 5 is a detail sectional view of the ratchet mechanism for locking the jaws; and Fig. 6 is a broken perspective view showing a modified form of opening loop.

The trap is provided with oppositely arranged curved jaws 10, which are preferably of a nearly semi-circular shape, and the jaws at their ends are pivoted together on a common pivot rod 11, and they are also provided with cross rods 12 and 13, which are parallel with the pivot rod, except that the rod 13 has an outer central bend 14 to provide room for a person to reach through the jaw and bait the trigger before the trap is set. The rods 12 and 13 project through the jaws at one end and are formed into eyes 15, in which are pivoted cross levers 16, which have eyes 17 at their outer ends, and the cord 18 by which the trap is fastened, is secured to one of these eyes and extends through the other, as shown in Fig. 1, and after the trap is sprung the strain on the cord acting on the levers 16 and the eyes 15, serves to pull the jaws more tightly together. If desired, the levers 16 may be dispensed with, and the cord 18 attached directly to the eyes 15.

Except when the trap is being baited, the opening in one side of the trap, formed by the bend 14 and the rod 13, is closed by a swinging hook 19, which is pivoted on the rod at one end, as shown at 20, and which at the opposite end is formed into a hook 21 adapted to engage the bend of the rod, as clearly shown in Fig. 1.

The jaws are normally pressed together by a stiff spring 22, which is coiled around the pivot rod 11, and one end 23 of which projects outward beneath the rod 12, while the opposite end 24 projects beneath the rod 13, and also bears against the hub 26 of a pawl 25, which pawl is pivoted on the rod 13, and is adapted to engage the teeth 27 on one side of the ratchet wheel 28, which ratchet wheel is journaled on the rod 11 and is secured, as shown at 29 in Fig. 5, to one of the jaws 10. The pressure of the spring holds the pawl 25 in engagement with the ratchet wheel, and the hub is preferably flattened slightly on one side, as shown in Fig. 5, to facilitate this action; but when the trap is to be set, the pawl may be pulled out of engagement with the ratchet wheel and the spring will hold it in a released position until it is again pushed back.

On one end of the pivot rod 11 which projects through the jaws, is a crank 30, which serves as a guide or feeler, and which, when the trap is lowered in water, strikes the ground first, and assists in lowering the trap into a proper position, that is, enabling it to lie upon its back. A cross bar 31, is pivoted as shown at 32, on the pivot rod 11, and one end of the cross bar is forked, as shown at 33, so as to engage the rod 13, while the other end extends beneath the rod 12 and terminates in a rounded or cylindrical end 34, to which a locking dog 35 is pivoted, as shown at 36, this dog being long enough to swing inward over the pivot rod, as shown in Fig. 1, and it has near its pivoted end a laterally extending lug 37, which turns on the rounded end 34 of the cross bar 31, and which by engaging the under side of said cross bar, limits the movement of the dog. The dog is also provided on its under side and near its pivoted end with an arm 38, which projects beneath the rod 12. See Fig. 1.

The trap is provided with a trigger 39, preferably of wire, which is coiled around the pivot rod 11 adjacent to the dog, thus forming an eye 40 which abuts with a collar 40$^a$ on the rod, and the coil at one end terminates in a hook 41, which is adapted to swing over the free end of the dog 35, and thus hold the dog down and the trap open. The free end of the trigger terminates in a coil 42, to which the bait is attached. The trigger may be swung out through the bend 14 when the trap is to be baited, and then swung back when the trap is set.

It will be seen that when the jaws are opened, the dog 35 may be thrown inward so as to hold down the rod 12, while the hook 41 of the trigger holds the dog in place, and as the end 33 of the arm 31 is in engagement with the rod 13, the trap will be held open; but when a creature pulls at the bait, the coil or eye 40 is turned, the hook 41 thrown off the dog, and the spring 22 throws the jaws quickly together. When this action takes place, the pawl 25 rides over the teeth of the ratchet wheel 27, and prevents any rebound of the jaws.

Radiating from the rods 12 and 13 are cross rods or wires 43, which project through the jaws 10, and are curved upward and inward so as to form claws 44, which are sharply pointed and which, when the trap is sprung, bury themselves in the flesh of the creature springing it, so as to prevent the said creature from getting loose.

To facilitate the easy opening of the trap, loops 45 are used, which have their upper ends bent over the jaws 10, as shown at 46 in Fig. 1, and when the trap is to be opened, the pawl 25 is released from the ratchet wheel, the thumbs thrust through the loops 45, and the jaws pulled apart. If desired, the loops 45 may be pivoted, as shown at 48 in Fig. 6, to cross bars 47, these cross bars connecting the central rods 43 of the opposite trap jaws. This enables the loops 45 to be turned up out of the way when the trap is set.

In Fig. 2, we have shown a modified form of trigger and locking mechanism for the trap, in which a cross bar 49 is pivoted on the pivot rod 11, and is also pivoted at one end, as shown at 50, to the rod 13, and to the opposite end of the cross bar which extends beneath the rod 12, is pivoted, as shown at 51, an upwardly-extending dog 52, having a hook 52$^a$ at its free end, which is adapted to engage a washer 53 on the rod 12, the washer having a shoulder 54 to abut with the edge of the hook. The washer 53 is formed on the pivoted end of the trigger 39, which is provided with the bait coil 42 as already described. The dog 52 is held normally in engagement with the washer and adapted to hold the rod 12 down and the trap open by a spring 55, one end of which is secured to the lower portion of the dog, as shown at 56, and the other end of which is formed into a hook 57, which hangs on the pivot rod 11. When the bait coil is pulled, the trigger 39 moves outward and the washer 53 is turned so as to throw off the dog 52, and permit the closing of the trap.

As shown in Fig. 3, a cross bar 58 is pivoted centrally on the pivot rod 11, and is also pivoted on the rod 12 of one of the jaws, and extends beneath the rod 13 of the opposite jaw. On the free end of the cross bar 58 is pivoted, as shown at 59, the dog 60, having a rounded upper end which carries a hook 61 adapted to engage the rod 13, and hold the trap open, and the trigger 39 is pivoted on the rod 13, as shown at 62, and has an arm 63 adapted to engage the rounded end of the dog 60, and hold the dog in engagement with the rod 13, the dog being held against the tension of the spring 60$^a$ which is secured to the lower end of the dog and the rod 12. When the trigger is pulled out, the arm 63 is carried above the dog, which immediately swings away from the rod 13, and the trap closes.

As illustrated in Fig. 4, a cross bar 64 is pivoted on the rod 11, and at one end on the rod 12, while the opposite end extends to a point adjacent to the rod 13, and on this end of the rod 12 the trigger 39 is pivoted, as shown at 65, the trigger having a projecting end 66, which is adapted to engage a washer 67 on the rod 13, and hold the trap open. When the bait is pulled, the trigger swings outward and the end 66 is removed from the washer 67 so as to release the jaws. In Fig. 4 a substitute for the ratchet wheel is also shown, comprising a rack bar 68, which is pivoted on the rod 12 and extends above the pivot rod, this bar having teeth 69 on its under side to engage the rod 13, and lock the jaws together. The rack bar is normally pressed into position to engage the rod 13 by one end 23 of the spring 22, this end of the spring bearing against a flange 68$^a$ on the end of the rack bar.

When the trap is to be set, the jaws are pulled open by inserting the thumbs in the loops 45, and then pulling the jaws apart. The jaws are locked in position by the dog 35 and the hook 41 on the trigger 39, or by one of the locking mechanisms described above, and when the bait is pulled, the trigger releases the dog and the jaws fly together as specified.

It will be understood that other means may be employed for releasing the locking dog of the jaws by the movement of the trigger, without departing from the principle of our invention.

Having thus described our invention, we claim as new and desire to secure by Letters Patent—

1. The combination, with the spring-pressed jaws pivoted together at their inner ends, upon the ends of a transverse rod which carries the operating spring of a locking mechanism for holding the jaws open, a trigger mechanism mounted on the said jaws and rod for releasing the jaws, and thumb loops secured to the jaws and extending outward from the backs thereof, substantially as specified.

2. The combination of the oppositely-arranged spring-pressed jaws pivoted together at their inner ends and one of them provided with an opening to facilitate baiting, a suitable locking mechanism to hold the jaws open, a trigger mechanism to release the jaws, and a hook to close the bait opening, substantially as specified.

3. A trap, comprising oppositely-arranged spring-pressed jaws pivoted together at their inner ends, locking mechanism to hold the jaws open, trigger mechanism to release the jaws, and a ratchet device to lock the jaws together when closed, substantially as specified.

4. The combination, with the spring-pressed jaws having a suitable locking and trigger mechanism, of an outwardly-extending feeler or crank secured to one end of the jaws, substantially as specified.

5. The combination, with the spring-pressed jaws having suitable locking and trigger mechanism, of the cross levers secured to the jaws at one end of the trap, and a fastening cord secured to the free end of one lever and extending through the opposite lever, substantially as specified.

6. The combination, with the spring-pressed jaws having a central pivot rod, and each having a rod substantially parallel with the pivot rod, of a cross bar pivoted on the pivot rod, connected with one of the parallel rods and extending beneath the opposite parallel rod, a locking dog pivoted to the lower end of the cross bar and adapted to swing above the adjacent parallel rod and over the pivot rod, and a trigger pivoted on the pivot rod and provided with a hook to engage the free end of the dog, substantially as specified.

HUBBARD S. GOFF.
ALVIN B. JUDKINS.

Witnesses:
WM. RILEY,
GEO. H. PINNEY.